US010356599B2

(12) United States Patent
Gonzalez et al.

(10) Patent No.: US 10,356,599 B2
(45) Date of Patent: *Jul. 16, 2019

(54) METHOD AND APPARATUS FOR CREATING AND USING A ROAMING LIST BASED ON A USER ROAMING PLAN

(71) Applicant: Apple Inc., Cupertino, CA (US)

(72) Inventors: Francisco J. Gonzalez, San Diego, CA (US); Vikram Bhaskara Yerrabommanahalli, Saratoga, CA (US); Chandiramohan Vasudevan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/932,292

(22) Filed: Feb. 16, 2018

(65) Prior Publication Data

US 2018/0255449 A1    Sep. 6, 2018

Related U.S. Application Data

(63) Continuation of application No. 15/172,053, filed on Jun. 2, 2016, now Pat. No. 9,900,765.

(51) Int. Cl.
*H04W 8/08* (2009.01)
*H04W 4/24* (2018.01)
(Continued)

(52) U.S. Cl.
CPC .......... *H04W 8/08* (2013.01); *H04L 63/0876* (2013.01); *H04L 67/02* (2013.01); *H04M 15/751* (2013.01);
(Continued)

(58) Field of Classification Search
CPC ....... H04W 8/08; H04W 48/18; H04W 80/06; H04W 88/02; H04W 48/16; H04W 4/02;
(Continued)

(56) References Cited

U.S. PATENT DOCUMENTS 7,885,654 B2  2/2011  Fadell
8,843,132 B2  9/2014  Fadell
(Continued)

FOREIGN PATENT DOCUMENTS

EP    1228656 B1    11/2006

OTHER PUBLICATIONS

RSP Architecture, Version 1.0, Document SGP .21, Dec. 23, 2015, GSM Association, 52 pages.
(Continued)

*Primary Examiner* — Inder P Mehra
(74) *Attorney, Agent, or Firm* — Dickinson Wright RLLP

(57) ABSTRACT

A server of a wireless operator creates a roaming list based on a user's roaming plan and sends the roaming list to the user's wireless device. The roaming list includes a list of public land mobile networks (PLMNs). When the user travels away from their home wireless network to another geographic area, the wireless device scans based on the roaming list for radio signals. The roaming list contributes to user satisfaction because timely attachment to a radio network while away from home occurs efficiently since the wireless operator creates the roaming list based on both i) roaming agreements that the wireless operator is a party to with other wireless operators, ii) the user's roaming plan, iii) the radio access technology (RAT) capabilities of the wireless device and iv) the RAT capabilities of other wireless operators in particular geographic regions.

20 Claims, 9 Drawing Sheets

(51) Int. Cl.
  *H04W 8/28* (2009.01)
  *H04M 15/00* (2006.01)
  *H04L 29/06* (2006.01)
  *H04L 29/08* (2006.01)
  *H04W 48/18* (2009.01)
  *H04W 8/18* (2009.01)
  *H04W 60/00* (2009.01)
  *H04W 80/06* (2009.01)
  *H04W 88/02* (2009.01)

(52) U.S. Cl.
  CPC ....... *H04M 15/80* (2013.01); *H04M 15/8038* (2013.01); *H04M 15/8044* (2013.01); *H04W 4/24* (2013.01); *H04W 8/18* (2013.01); *H04W 48/18* (2013.01); *H04W 60/00* (2013.01); *H04W 80/06* (2013.01); *H04W 88/02* (2013.01)

(58) Field of Classification Search
  CPC . H04M 15/8038; H04M 15/751; H04L 67/02; H04L 63/0876; H04L 63/164; H04L 63/168
  USPC ... 455/432.1, 434, 435.2, 435.3, 510, 552.1, 455/403, 410, 411, 412.1, 418, 420, 421, 455/422.1, 432.3, 455, 515, 404.2, 414.1, 455/414.2, 414.3; 235/472.02; 709/204, 709/205, 217; 715/760; 713/151, 152; 340/539.2, 7.27
  See application file for complete search history.

(56) References Cited

U.S. PATENT DOCUMENTS

| | | | | |
|---|---|---|---|---|
| 9,900,765 | B2* | 2/2018 | Gonzalez | H04L 63/0876 |
| 2002/0087674 | A1 | 7/2002 | Guilford et al. | |
| 2006/0077926 | A1* | 4/2006 | Rune | H04L 45/34 370/328 |
| 2006/0116125 | A1 | 6/2006 | Buckley et al. | |
| 2006/0291455 | A1* | 12/2006 | Katz | H04L 29/06 370/355 |
| 2008/0096559 | A1 | 4/2008 | Phillips et al. | |
| 2010/0267384 | A1 | 10/2010 | Dwyer et al. | |
| 2010/0291924 | A1 | 11/2010 | Antrim et al. | |
| 2011/0151836 | A1 | 6/2011 | Dadu et al. | |
| 2011/0306318 | A1 | 12/2011 | Rodgers et al. | |
| 2012/0108206 | A1 | 5/2012 | Haggerty | |
| 2012/0108207 | A1 | 5/2012 | Schell et al. | |
| 2013/0227646 | A1 | 8/2013 | Haggerty et al. | |
| 2013/0237215 | A1 | 9/2013 | Vashi et al. | |
| 2013/0286950 | A1 | 10/2013 | Pu | |
| 2014/0010203 | A1 | 1/2014 | Zhang et al. | |
| 2015/0056985 | A1* | 2/2015 | Swaminathan | H04W 88/06 455/432.1 |
| 2015/0222697 | A1* | 8/2015 | Bassiouny | H04L 67/1002 709/203 |
| 2015/0289114 | A1 | 10/2015 | Dandra et al. | |
| 2016/0246611 | A1 | 8/2016 | Li et al. | |
| 2017/0105150 | A1 | 4/2017 | Alsson et al. | |
| 2017/0238166 | A1 | 8/2017 | Cao | |
| 2018/0123803 | A1* | 5/2018 | Park | H04L 9/14 |
| 2018/0255449 | A1* | 9/2018 | Gonzalez | H04L 63/0876 |

OTHER PUBLICATIONS

3rd Generation Partnership Project; 3GPP TS 23.122 (Version 13.4.0), Technical Specification Group Core Network and Terminals; Non-Access-Stratum (NAS) functions related to Mobile Station (MS) in idle mode (Release 13), Mar. 2016, Valbonne—France, 49 pages.

3rd Generation Partnership Project; 3GPP TS 24.234 (Version 12.2.0), Technical Specification Group Core Network and Terminals; 3GPP System to Wireless Local Area Network (WLAN) interworking; WLAN User Equipment (WLANUE) to network protocols; Stage 3 (Release 12), Mar. 2015, Valbonne—France, 40 pages.

3rd Generation Partnership Project; 3GPP TS 31.111 (Version 13.3.0), Technical Specification Group Core Network and Terminals; Universal Subscriber Identity Module (USIM) Application Toolkit (USAT) (Release 13), Mar. 2016, Valbonne—France, 137 pages.

International Patent Application No. PCT/US2017/035481—International Search Report and Written Opinion dated Sep. 28, 2017.

* cited by examiner

METHOD AND APPARATUS FOR CREATING AND USING A ROAMING LIST BASED ON A USER ROAMING PLAN

CROSS-REFERENCE TO RELATED APPLICATIONS

The present application is a continuation of, and claims the benefit of, U.S. patent application Ser. No. 15/172,053, entitled "METHOD AND APPARATUS FOR CREATING AND USING A ROAMING LIST BASED ON A USER ROAMING PLAN," filed Jun. 2, 2016, which is incorporated herein by reference in its entirety for all purposes.

FIELD

The described embodiments relate to a server hosted in a home wireless carrier network providing a list of prioritized wireless carriers for access by a wireless device. The wireless device uses the list while in a geographic region different than that of the home network.

BACKGROUND

A user can perform activities including downloading and uploading data and/or carrying out a voice call. The activities, for example, can be done using a radio device, also known as a wireless device, which performs transactions via radio signals with a radio network. The format, timing, information-carrying ability and multi-user medium-sharing properties of the radio signals are the result of a particular radio access technology (RAT) employed by the wireless device and the radio network. A RAT can also be referred to as a radio interface. A problem arises when the user is away from home yet wishes to quickly establish a connection with a visited radio network so as to initiate a data transaction or receive a voice call. Use of a visited radio network is often referred to as roaming.

A given radio network is generally connected with other networks, such as the Internet. Data can be downloaded from; and uploaded, to sites or other parties via the Internet. The business entity that manages and/or provides the radio network can be referred to as a home wireless carrier with respect to the user and wireless device. Radio networks generally are characterized by a limited geographic footprint or coverage area. That is, when the user physically carries the wireless device away from the home radio network, the wireless device and the radio network are unable to successfully exchange information by radio with the home radio network. This may disappoint a user and lead to user dissatisfaction with their wireless device. The home wireless carrier can have business arrangements, known as roaming agreements, with other wireless carriers in other geographic regions. The roaming agreements allow the user to successfully communicate, via the radio network equipment of those other wireless carriers, by the user using their wireless device while away from their home radio network. Easy and affordable use of a wireless device to communicate while away from a home network will often result in user satisfaction.

In general, the wireless device may be referred to as a Mobile Subscriber (MS) or User Equipment (UE). The UE can include a Subscriber Identity Module (SIM), also known as a smart card, and/or the UE can include an electronic SIM (eSIM) and/or universal subscriber identity module (USIM). The application will refer to these generally with the term USIM. The USIM can be identified by an Integrated Circuit Card Identifier (ICCID). The USIM is within the control of the home wireless carrier, in the sense that only the home wireless carrier is in possession of the security secrets needed to gain access and read or write sensitive data from or to the USIM. The wireless phone number associated with a given USIM is also associated with an international mobile subscriber identity (IMSI). An embedded Universal Integrated Circuit Card (eUICC) in the UE can host the USIM.

Message flows that place data in a wireless device and/or in a network server need to be secure. Security has two main aspects: authentication and confidentiality. Authentication is the process of assuring the identity of the party that is asking to talk, the claimant. Confidentiality is maintained by not allowing unintended parties to read transmitted information. Authentication is often carried out using a challenge-response protocol. A challenger sends a challenge to the claimant. If the claimant is able to prove in its response possession of a particular secret, then the challenger is satisfied about the identity of the claimant. Confidentiality is maintained by encryption. A sending party encodes information with one or more keys, where those keys (or related keys) are known to the recipient. Keys may be frequently changed to limit loss of confidentiality due to a third party obtaining a particular key.

Travel of the user to a geographic region away from their home radio network is known as roaming. The home wireless carrier configures the wireless device to be able to find visited radio networks over which the wireless device can communicate when roaming by use of a roaming list. A roaming list is a list of geographic places and radio networks within those geographic places that have roaming agreements with the home wireless carrier. The roaming list can be stored in a USIM. In practice, the entries on the list include at least a place or geographic region identifier known as a mobile country code (MCC) and a wireless network identifier known as a mobile network code (MNC). The two identifiers taken together, MCC:MNC, are referred to as identifying a public land mobile network (PLMN). A given PLMN will often support more than one RAT. For example, a wireless carrier in Canada may support both GSM and Wi-Fi Calling.

A wireless device, on power-up, scans radio signals in search of the home radio network. A scan is a trial-and-error radio signal observation or measurement at various radio frequencies. If the measurement reveals the presence of significant radio energy, the wireless device attempts to decode information at the radio frequency and identify the source of the radio transmission. If the home radio network is not found, the wireless device performs scans at additional frequencies, based on the roaming list, in hopes of discovering some radio network. If some other radio network is found on a particular frequency, the wireless device obtains system information, and may continue to monitor the particular frequency and wait for the user to make a demand to communicate or receive data. System information generally includes network identification data. Such network monitoring while waiting for a user demand is referred to as camping. In some cases, the wireless device transmits the IMSI of the active USIM to the visited radio system in hopes of being accepted by the found radio system, i.e., registered with the found radio system, and progresses to communicating through the found radio system to other networks, such as the Internet. There is some uncertainty in the chances of success, in terms of acceptance, when transmitting to the visited radio system. For example, the IMSI may be rejected, or the found radio network may not allow roaming in some limited geographic area in which the wireless device happens to be. A benefit of registering is that incoming calls can be routed to the visited radio system and thence to the wireless device.

A wireless carrier may store, or provision, the roaming list in a USIM. A wireless carrier can update, or refresh, the roaming list using a procedure known as steering of roaming. The provisioning network entity may be a server and the USIM can be viewed as a client. Thus the SIM and the provisioning network entity may have a client-server relationship. The server can check the identity of a SIM using authentication techniques. The server can protect information, maintain confidentiality, sent to the SIM using encryption techniques.

More information on roaming can be found in, for example, "Non-Access-Stratum (NAS) functions related to Mobile Station (MS) in idle mode," 3GPP TS 23.122 version 13.4.0, March, 2016. More information on provisioning of eSIMs and USIMs can be found, for example, in "RSP Architecture," Version 1.0, Dec. 23, 2015, GSM Association document SGP.21.

SUMMARY

Representative embodiments set forth herein disclose various systems and techniques for a wireless carrier to assist a user of a wireless device that is roaming by providing a PLMN list based on a roaming plan associated with the device. A roaming plan may also be referred to as a data plan herein. In some embodiments, the wireless carrier compares the roaming plan to roaming agreements to which the wireless carrier is a party and prioritizes PLMNs based on the roaming plan to form the PLMN list. In some embodiments, the wireless carrier is the home wireless carrier of a USIM in the wireless device. The wireless device requests the PLMN list at reboot or the wireless carrier pushes the PLMN list to the wireless device by sending the wireless device a trigger message.

In some embodiments, the PLMN list is based on three categories of priority which can be thought of as buckets. For example, the wireless carrier can generally place PLMN identifiers into one of three buckets: i) an unlimited bucket, ii) a metered bucket, and iii) a qualifying bucket. The qualifying bucket may also be referred to herein as the "others bucket" or the "others_preferred bucket." A given PLMN is only identified in one of the three buckets. For example, the set of identifiers in the unlimited bucket is mutually exclusive of the set of identifiers in the metered and qualifying buckets. The PLMN list is ordered in a priority sequence. The first identifier in the list is the highest priority, and the second identifier in the list is next highest priority and so on. Adjacent list entries with the same priority are indicated, in some embodiments, by a data structure name/value pair indicating a priority index or level.

The unlimited bucket holds PLMN identifiers of PLMNs for which the user of the wireless device has unlimited data usage while roaming in a particular geographic region, i.e., no overage charges will be placed on the user's account as the user sends and receives increasing amounts of data while using a given PLMN identified in the unlimited bucket. Such a PLMN may limit the bandwidth allocated to the wireless device after a certain number of bytes of data have been transferred (i.e., total of sent and received data by the wireless device). The term "unlimited" pertains to sending or receiving an amount of data and incurring no overage charge regardless of the amount of data. The absence of an overage charge is a contractual term of the user's roaming plan. A user may upgrade a roaming plan to include no overage charges; such a plan would then be represented in the unlimited bucket.

The metered bucket contains PLMN identifiers for PLMNs that the user of the wireless device has contracted for service under the user's roaming plan, but, according to contractual terms, overage charges may be imposed after the wireless device transfers an amount of data exceeding a data allowance. In some embodiments, the user is notified of the impending depletion of the data allowance. A user may upgrade a roaming plan for a given geographic region from metered to unlimited.

The qualifying bucket holds PLMN identifiers of PLMNs to which the wireless device will be allowed to register, but without the unlimited or metered service. In some circumstances, the wireless device can be in a particular geographic region for which the unlimited bucket and metered bucket are empty. The user, in some embodiments, is provided with a prompt on the user interface of the wireless device suggesting that the user upgrade a PLMN identifier from the qualifying bucket by signing up for a roaming plan with the unlimited or metered characteristics. The necessary protocol messages to and from the wireless device, in some embodiments, pass over a Wi-Fi connection. After the upgrade, the wireless device can register on a visited wireless network in the particular geographic region and receive wireless services.

A wireless device roaming switch parameter may be set to off by the user. In some embodiments, if a PLMN identifier of a PLMN is present in the unlimited bucket, then the wireless device attaches to the PLMN even though the roaming switch parameter is set to off. Because no overage charges will accrue, the user will not be charged for using data services on the PLMN.

If the roaming switch parameter is set to off and there is no PLMN identified in the unlimited bucket, but a particular PLMN is indicated in the metered bucket, the wireless device, in some embodiments, prompts the user with information about the metered plan. For example, the wireless device, in some embodiments, provides a user notification about the metered allowance for the particular PLMN identified in the metered bucket. The user may then elect to enable roaming by setting the roaming switch parameter to "ON" and the wireless device may then attach to the particular PLMN.

The PLMN list is placed in the memory by the wireless device. In some embodiments the memory is a cache memory. In some embodiments, the state of the memory persists across device reboots. That is, in some embodiments, the memory is a non-volatile memory.

Updating or refreshing of the PLMN list can be initiated by the wireless carrier. Also, updating or refreshing of the PLMN list can be requested by the wireless device upon power-up (boot). In some embodiments, periodic polling to update the PLMN list is not done by the wireless device. Avoiding periodic polling avoids signaling traffic burdensome to the wireless carrier.

In some embodiments, the PLMN list received from the wireless carrier is merged with a roaming list maintained by a USIM in the wireless device to form a merged list. Wireless carrier-initiated updates of the PLMN list are based on a roaming plan of the user. Such a PLMN list, sent to the wireless device, improve the PLMN selection process by the wireless device. This is because the wireless carrier is aware of the roaming plan characteristics that the user has subscribed to with regard to the wireless device. The wireless carrier is also a party to roaming agreements worldwide and so has up-to-date information about available support for roaming in various geographic regions. By providing the PLMN list based on the wireless device roaming plan, user satisfaction is increased. The user may be unaware that their roaming plan includes PLMNs with unlimited features and/or PLMNs with metered features. Also, a user may be concerned about incurring high roaming charges, and purposefully set the roaming switch parameter to "OFF" although the wireless device may be eligible for unlimited service. The embodiments disclosed herein provide roaming network selection based on the roaming plan associated with the wireless device and increase user satisfaction.

By providing the PLMN list based on the characteristics of the user's plan, attachment to a suitable PLMN is faster on average than with network steering practices alone.

The PLMN list, in some embodiments, includes information on supported RATs. By use of the PLMN list, the wireless device avoids scanning for a particular RAT of a given PLMN only to discover by absence of signal energy of the proper format and timing that the particular RAT is not supported by the given PLMN. The wireless carrier assists the wireless device in a particular geographic area to identify a suitable RAT for attachment. In some embodiments, the wireless device using the PLMN list excludes RATs not indicated in the PLMN list from attachment attempts. In some embodiments, because the PLMN list is prioritized, the wireless device first attempts attachment using higher priority RATs, and then if unsuccessful, attempts to attach using a RAT from further down (priority-wise) in the PLMN list.

Each PLMN identified in the PLMN list has a priority value. Priority is generally indicated by the position of a given PLMN identifier in the list. For example, the highest priority PLMN for a given geographic region is listed first, in some embodiments. The geographic region of a PLMN is indicated by the mobile country code (MCC) portion of the PLMN identifier. For a situation in which two or more PLMNs are associated with a same priority ranking, the PLMN list, in some embodiments, includes a name/value pair priority variable or index. Adjacent PLMN identifiers having the same priority level are provided with the same index in the value portion of their associated name/value pair priority variable.

The wireless device, in some embodiments, communicates with an entitlement and feature registration server ("entitlements server," hosted by the wireless carrier) using an entitlements protocol. The entitlements protocol can use a javascript object notation (JSON) for exchanging data between the wireless device and the entitlements server. More information on JSON can be obtained from the Internet Engineering Task Force (IETF) RFC (request for comments) 7159 "The JavaScript Object Notation (JSON) Data Interchange Format." The entitlements protocol, in some embodiments, consists of a request-response transaction flow performed over an HTTPS connection over a cellular data connection to the entitlements server. HTTP stands for Hypertext Transport Protocol (see, for example RFC 7230). HTTP coupled with Transport Layer Security (TLS) protocol (see, for example, RFC 2246) is called HTTPS. The wireless carrier, in some embodiments, provides a URL (Universal Resource Locator) to the wireless device, and the wireless device addresses requests to the URL. Security over the HTTPS connection, in some embodiments, is established by the wireless carrier providing a Secure Socket Layer certificate (SSL certificate, see, for example, RFC 6101), certificate issued by a trusted certificate authority (e.g., Entrust, Verisign). The request message, in some embodiments, uses an HTTP message type of POST. The entitlement server responds with a HTTP message including a content-type header, a content-encoding header, and a content-length leader.

The wireless device can use a USIM to perform an EAP-AKA procedure (see, for example, RFC 4187) with an authentication system linked to the entitlements server when seeking, for example, subscriber information such as data plan information. EAP-AKA stands for extensible authentication procedure authentication and key agreement. The entitlements server, after successful authentication procedures, can obtain the roaming plan information from a provisioning system (e.g., a database) hosted by the wireless carrier. The authentication procedures, in some embodiments, include supplying a pre-arranged token from the wireless device to the entitlements server to prove authenticity of the wireless device.

Requests and responses in the entitlements protocol can be expressed in plain text data representations using JSON. A request, in some embodiments, includes a request identifier and an action name. A response, in some embodiments, includes a response identifier, a status value, and a PLMN list. The PLMN list may also be referred to herein with the variable name "plmns-list." Available RATs are indicated, in some embodiments, with bit-position-encoded values known as flags. For example, the RAT flag for GSM can be expressed in binary notation as $00000001_2$ (hexadecimal notation "0x1") while the RAT flag for CDMA 1× can be expressed as $00000010_2$ (hexadecimal notation "0x2"). A logical OR operation on these two flags to indicate that GSM and CDMA 1× are available would result in the value $00000011_2$ (hexadecimal notation "0x3"). If Wi-Fi Calling is also available (e.g., RAT flag "0x80"), the result of the logical OR would be $10000011_2$ ("0x83").

A response message conveys the PLMN list, i.e., the contents of each non-empty bucket. In some embodiments, the response message body includes a JSON representation of the PLMN list. A first array of information corresponds to the unlimited bucket, in some embodiments. PLMNs are represented in a PLMN list by PLMN identifiers. One PLMN identifier consists of two values taken together: MCC and MNC. Corresponding to the unlimited bucket, if represented, an array will be given for one or more MCC values. For each MCC value represented, a set of three-tuples is given, in some embodiments. One three-tuple can represent: i) an MNC value, ii) a RAT value based on the RAT flags, and iii) a priority integer value. Similarly, the contents of the metered bucket and the qualifying bucket, if non-empty, are represented with an array for one or more MCC values. Identical PLMN identifiers are not placed in two different buckets.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

PLMN List, Buckets

A wireless device, in some embodiments, is provisioned with a PLMN list based on a roaming plan associated with the device. The PLMN list is a prioritized list of wireless carriers based on geographic region. Use of the PLMN list improves the overall user experience when the user travels with their wireless device. The PLMN list, in some embodiments, contains information in the form of arrays within a data object. The arrays can be thought of as buckets. A first bucket corresponds to unlimited data usage without overage charges. A second bucket corresponds to metered data usage. When using a PLMN represented in the second bucket, data usage may not accrue an extra charge until a data allowance has been used up. After the data allowance is depleted additional data transfers incur overage charges. The third bucket is a qualifying bucket representing one or more PLMNs that the user has not signed up for, but which are good candidates for user sign-up from the point of view of the home wireless carrier. The qualifying bucket may also be referred to herein as "others" or "others_preferred."

PLMN List, Request, Travelling Wireless Device

The PLMN list can be requested by the wireless device upon power-up, also referred to as upon boot. Also, the home wireless carrier, in some embodiments, triggers a PLMN request message from the wireless device by sending a trigger message to the wireless device. The request is a "getPreferredRoamingNetworks" request message, in some embodiments.

Figure 1:
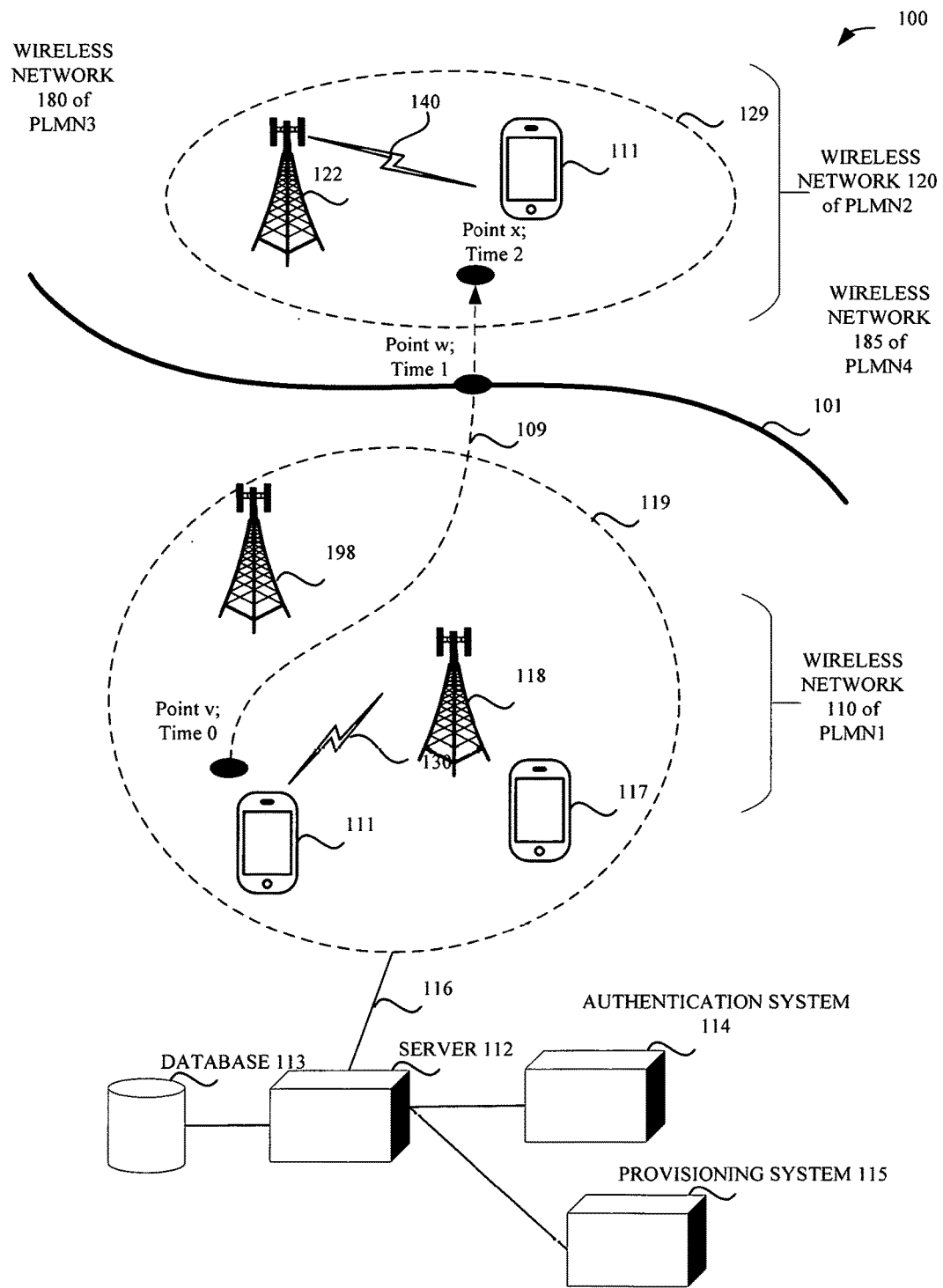
FIG. 1 illustrates an exemplary wireless device in communication with a server in systems including exemplary base stations, wireless networks and PLMNs.

FIG. 1 illustrates a system 100 including wireless devices 111 and 117 in a wireless network 110 of a PLMN1. The wireless network 110 is operated by a Wireless Carrier A (not shown). The wireless network 110 includes infrastructure components, for example, server 112, database 113, authentication system 114, and provisioning system 115. The geographic footprint of the wireless network 110 is illustrated schematically as bounded by the dashed circle 119. The wireless network 110 includes example base stations 118, and 198. The wireless device 111 communicates with a base station 118 with radio signals 130.

Initially, a generic PLMN list, in some embodiments, is provided to the wireless device 111 from the provisioning system 115 via the server 112.

At some time after initial provisioning, the wireless device 111 requests an up-to-date PLMN list from the server 112. For example, this request could be sent by the wireless device 111 on boot, or it could be triggered by a message from the server 112. The wireless device 111, in some embodiments, presents a previously-generated security token to the server 112 to prove that wireless device 111 is registered with the server 112. The server 112 may challenge the wireless device 111 and perform an authentication sequence with the assistance of the authentication system 114. The wireless device 111, in some embodiments, computes outgoing security responses and checks incoming security responses using a USIM as per RFC 4187 "Extensible Authentication Protocol Method for $3^{rd}$ Generation Authentication and Key Agreement (EAP-AKA)".

A triggering scenario, for example, may be initiated when a user of the wireless device 111 signs up for a new roaming plan. The server then, in some embodiments, triggers the request for a PLMN list.

The server 112 responds to a request for a PLMN list by i) obtaining information about the user's roaming plan from the database 113, ii) comparing the user's roaming plan with a collection of roaming agreements that Wireless Carrier A is a party to, iii) forming a PLMN list based on the user's roaming plan, and iv) sending the PLMN list to the wireless device 111. The wireless device 111 receives the PLMN list and stores it. The PLMN list is stored in non-volatile memory in the wireless device 111, and/or in a USIM, residing within the wireless device 111. In some embodiments, the PLMN list is stored in disk and/or flash memory in the wireless device 111 and/or the USIM within the wireless device 111.

A roaming scenario is one in which a user travels geographically with their wireless device outside of the geographic footprint in which the home radio network provides radio signals, thus moving outside of radio coverage. Dashed arrow 109 of FIG. 1 indicates the user of wireless device 111 taking their device from a point v at a Time 0 outside of the geographic footprint 119 of wireless network 110 and crossing a boundary 101 (point w at a Time 1) and reaching a point x at a Time 2. The boundary 101 indicates that the MCC:MNC pair (i.e., PLMN1) of which wireless network 110 and geographic footprint 119 are a subset, is not applicable at point x. The wireless device 111 thus cannot successfully communicate using the wireless network 110 from point x. However, the wireless device has entered into the geographic footprint 129 of wireless network 120 (i.e., PLMN2). In addition, the wireless device, at point x in the illustration of FIG. 1, is able to receive signals from wireless network 180 of PLMN3 and wireless network 185 of PLMN4. The geographic footprints and base stations of radio networks 180 and 185 are not shown. The coverage areas of wireless networks 180 and 185 include point x. The points v, w, and x are geographic points.

Scanning for a Radio Network, Using the PLMN List

The wireless device 111 may have had power on during transit from point v to point x, or it may have been powered off (for example, carried in a plane on a trip). At point x, the wireless device 111 scans for radio signals of PLMN1 and cannot find the wireless network 110 because point x is outside of the geographic footprint 119. The wireless device 111 then consults the PLMN list and scans downlink frequencies associated with the ordered PLMN/RAT combinations in priority order. If the identifier of PLMN2 is in the unlimited data object of the PLMN list (corresponding to the unlimited bucket) and PLMN3 and PLMN4 are not, then the wireless device will scan for downlink signals from PLMN2. In FIG. 1, the wireless device 111 receives radio signals 140 from a base station 122. Intervening unsuccessful scans may occur for other PLMNs more highly prioritized in the PLMN list than PLMN2, but without coverage at point x.

In some scenarios, PLMN2 is not associated with the unlimited bucket nor is it associated with the metered bucket; yet PLMN3 is associated with the metered bucket. If there are no PLMNs associated with the unlimited bucket, or the unlimited bucket is not empty but none of the unlimited-bucket-associated PLMNs have coverage at point x, the wireless device 111 will, eventually, scan a frequency associated with PLMN3 and camp on that frequency. The wireless device 111 efficiently scans for PLMNs because Wireless Carrier A is aware of the (networks, places) pairs (i.e. PLMNs) supporting the RATs that the wireless device 111 is able to communicate on, and only PLMNs supporting those RATs are in the PLMN list. Also Wireless Carrier A is aware of the roaming plan to which the user of wireless device 111 has subscribed, so those PLMNs that are favorable to the user in a financial charge sense are prioritized above others.

Message Sequence

Figure 2:
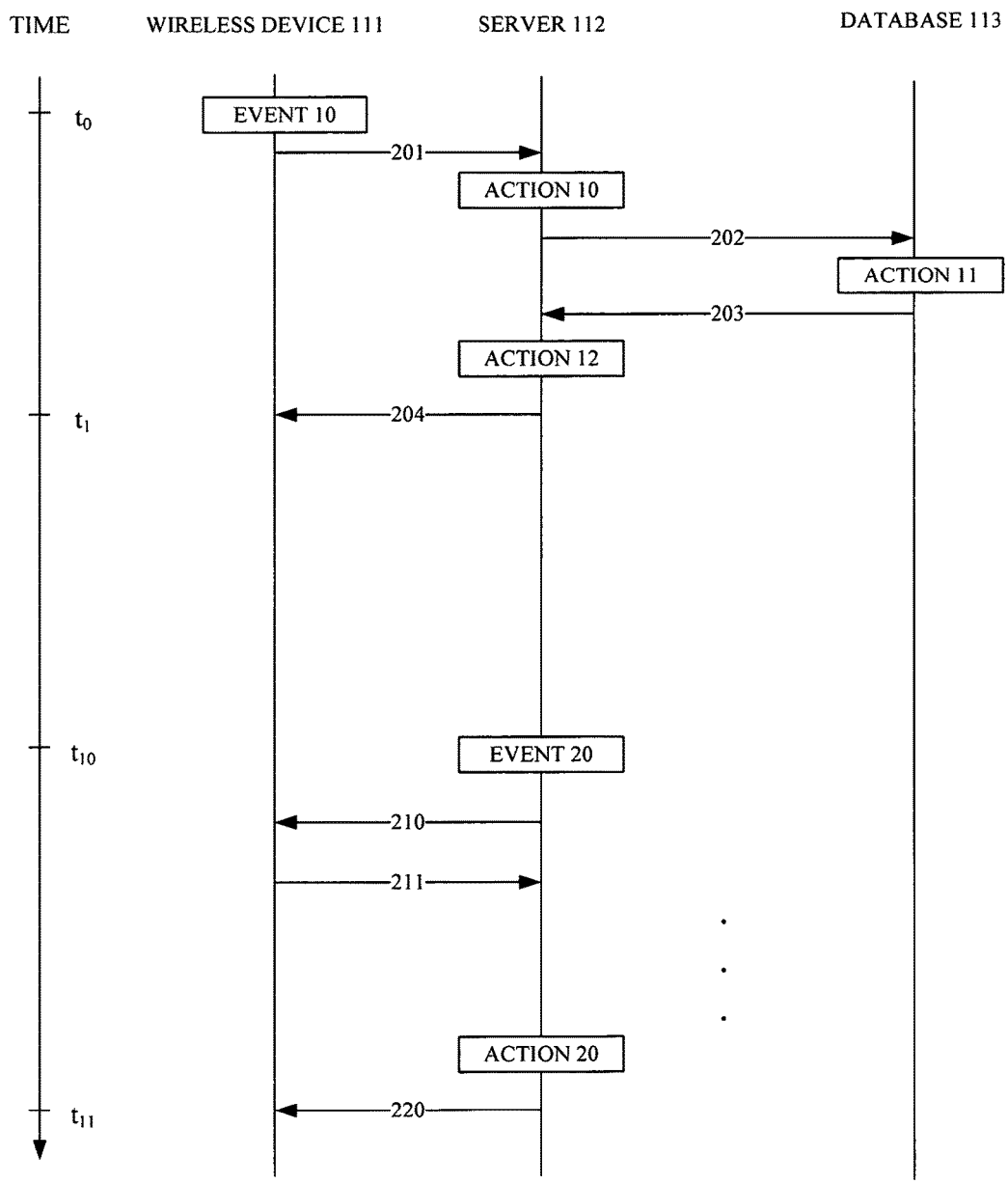
FIG. 2 illustrates exemplary request and response message flows between the wireless device and the server, according to some embodiments.

FIG. 2 message flows 200 illustrating two event-driven PLMN list request scenarios. An Event 10 at a time $t_0$ at the wireless device 111 corresponds to power-on (boot up). The wireless device 111, in some embodiments, sends a request message 201 after power-on to the server 112. The server 112, in some embodiments, performs an authentication operation, shown as Action 10. After receiving the message 201, and checking a security token or performing another authentication operation, the server 112 sends a message 202 to a database 113 asking for the roaming plan associated with wireless device 111. The database 113 responds with message 203 containing information about the roaming plan of the wireless device 111. Action 12 represents the server 112 creating a PLMN list specifically for the wireless device 111. The PLMN list is based on the roaming plan of the wireless device 111 and roaming agreements that Wireless Carrier A (which operates the server 112) has with other wireless carriers. The PLMN list is then sent in a message 204 to the wireless device 111 at a time $t_1$.

At a time $t_{10}$ in FIG. 2 an Event 20 corresponds to the server 112 deciding to update the PLMN list at the wireless device 111. This may be subsequent to, for example, the user of the wireless device 111 selecting a new roaming plan, or it could be caused, for example, by Wireless Carrier A entering into a new roaming agreement with another wireless carrier. The server 112 sends a trigger message 210 to the wireless device 111, and the wireless device 111 then requests a new PLMN list using message 211. Authentication may occur as described with regard to Action 10. Correspondence with the database 113 then occurs as at message 202, Action 11, and message 203 (the similar messages are not shown) and the server 112 creates the PLMN list at Action 20. The server 112 then sends the updated PLMN list to the wireless device in a message 220 at a time $t_{11}$. Wireless Carrier A may establish a conventional PLMN list using, for example, steering of roaming procedures. The wireless device 111, in some embodiments, merges the PLMN list received from the server 112 with the conventional PLMN list to produce a merged PLMN list. In some embodiments, when merging lists, the wireless device 111 performs a deep merge of the conventional PLMN list into the PLMN list received from the server 112. In some embodiments, the deep merge identifies conventional PLMN list members as belonging to either an unlimited array or a metered array. Within each array, under a given PLMN value (MCC:MNC), the PLMN list members from the server 112 take precedence (higher priority) over members from the conventional PLMN list associated with the same given PLMN value. When roaming, the wireless device selects PLMN identifiers from the merged PLMN list as candidates to be scanned for.

PLMN List Creation Logic

Figure 3:
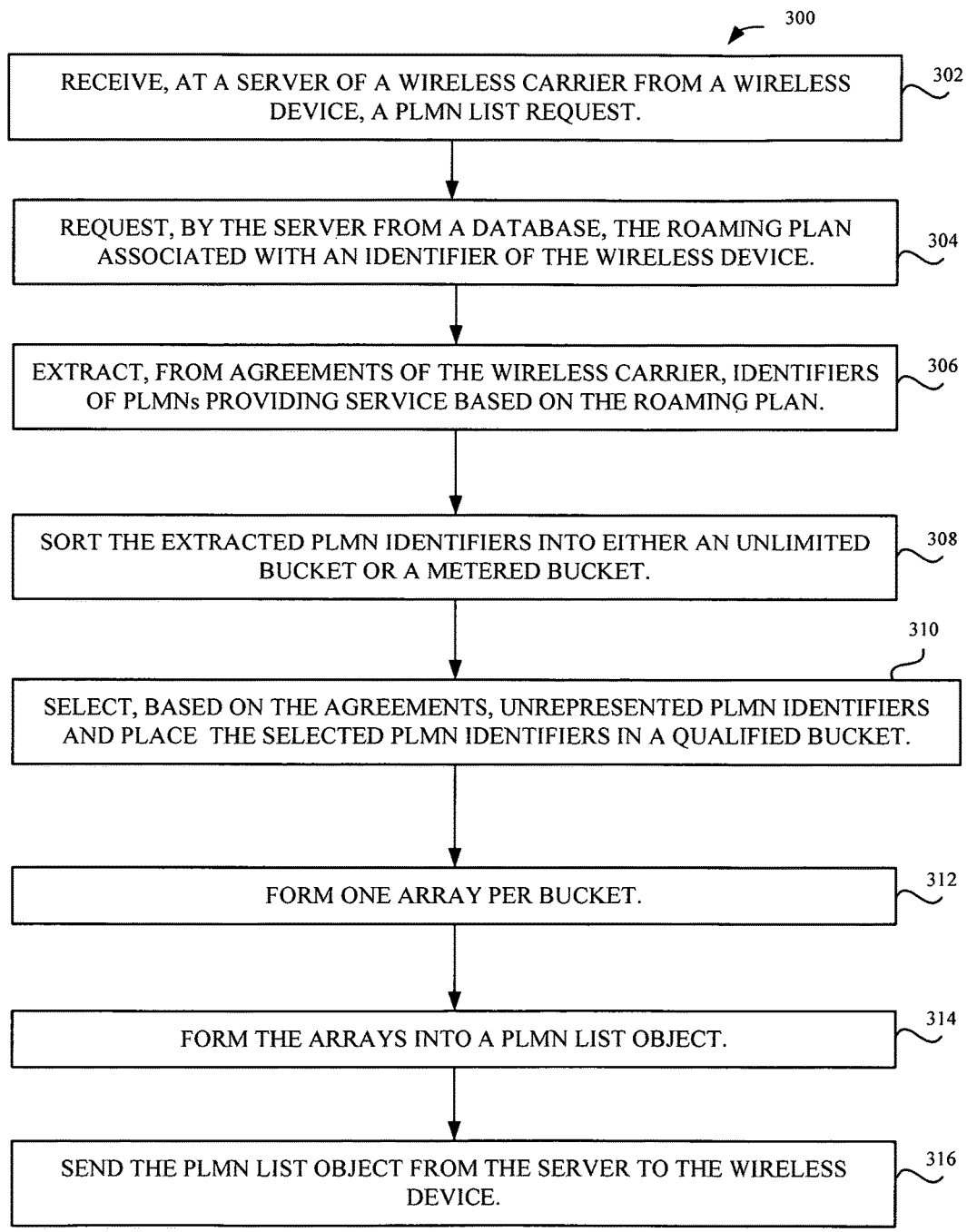
FIG. 3 illustrates exemplary logic for a server receiving a request from the wireless device, creating a PLMN list and sending it to the wireless device in a response message, according to some embodiments.

FIG. 3 illustrates logic 300 for creation and delivery of a PLMN list. At 302, a server receives a PLMN list request from a wireless device. The server is hosted by a wireless carrier. The wireless carrier, in some embodiments, is associated with an active USIM in the wireless device. The request can include an IMSI or other identifier associated with the active USIM. At 304, the server requests from a database a roaming plan associated with the wireless device. The association can be, for example, by means of an IMSI corresponding to the active USIM. The roaming plan is a contractual item that identifies other wireless carriers and geographic regions, i.e., PLMNs. The PLMNs on the list will provide service to the wireless device when the wireless device is in a coverage area of a listed PLMN. The database supplies the requested roaming plan (not shown). At 306, the server extracts from agreements of the wireless carrier with other wireless carriers, identifiers of those PLMNs providing service based on the roaming plan.

At 308, the server sorts the extracted PLMN identifiers into unlimited and metered buckets. At this point, the qualifying bucket is empty. No PLMN identifier is represented in more than one bucket. At 310, the server selects some unrepresented PLMNs, based on the agreements of the wireless carrier, and places identifiers of the selected unrepresented PLMNs in the qualifying bucket.

At 312, the server forms the identifiers found in the unlimited bucket into an array. The array is, in some embodiments, a plain text representation of strings and decimal numbers (a JSON format). Arrays are similarly formed from the contents of the metered bucket and the qualifying bucket. At 314, the server forms the three arrays into a data object representing a PLMN list. At 316, the server sends the PLMN list to the wireless device. The wireless device receives the PLMN list and stores it in non-volatile memory. The wireless device can store it in non-volatile memory of the wireless device and/or the wireless device can forward the list to the active USIM associated with the IMSI or other identifier that was sent to the server in the request at 302. The active USIM, in some embodiments, updates or replaces an existing PLMN list with the newly received PLMN list. The USIM or wireless device, in some embodiments, merges the list received from the server with a generic PLMN list established by steering of roaming procedures.

Protocol Stack Diagram

Figure 4:
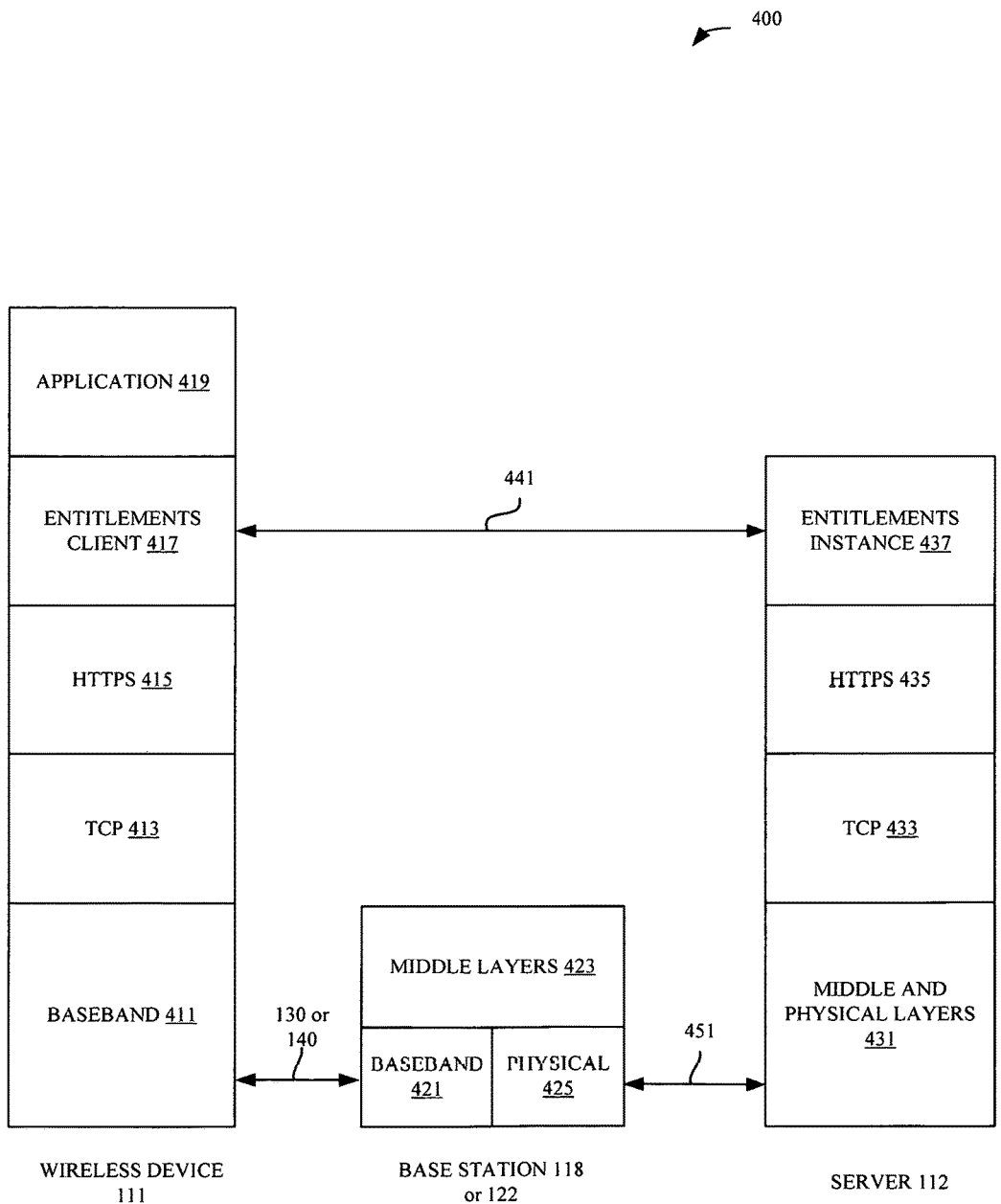
FIG. 4 illustrates exemplary protocol stacks for a client in the wireless device communicating with a protocol instance in the server, according to some embodiments.

FIG. 4 illustrates partial protocol stacks 400 at the wireless device 111, the base station 118, and the server 112. Entitlements protocol client 417 in the wireless device 111 sends request messages to entitlements instance 437 in the server 112 which responds with response messages, the whole shown by double-headed arrow 441. 441 can be referred to as a flow. The instance 417 in the wireless device 111 is, in some embodiments, a client in a client-server relationship with the instance 437 in the server 112. In practice, there are many other protocols involved and also more radio, cellular network entities, and landline or backhaul network entities involved. FIG. 4 provides context for the placement of the entitlements protocol in communication between the wireless device 111 and the server 112. In some embodiments, an application layer 419 with an interface to a user of the wireless device participates in acquisition of a new or updated PLMN list when the user upgrades their roaming plan.

The entitlements protocol is carried by an HTTP layer flow. The HTTP layer is represented in FIG. 4 by the peer instances 415 and 435. The HTTP layer flow is carried by a TCP layer shown by instances 413 and 433. The radio aspects of wireless device have been represented by an instance 411 which communicates with a baseband instance 421 at the base station 118 via signals 130. The same flow 441 can be carried via a base station in a visited network such as PLMN2, for example base station 122 via radio signals 140 after a registration of the wireless device 111 with PLMN2. At the base station 118, middle layers 423 and physical instance 425 are involved in transferring physical layer data to and from the server 112 via a connection 451 to lower layers 431 of the server 112.

HTTP Transport Encoding

The entitlements protocol uses a request-response transaction flow over an HTTPS connection. The request message, in some embodiments, is an HTTP POST. An HTTP POST request asks that a server accept and store information found in the body of the request. Example headers in a request are shown in Table 1.

TABLE 1

| Header Field | Header Value |
| --- | --- |
| content-type: | application/json |
| content-encoding: | gzip |
| content-length: | <integer> |
| accept: | application/json |
| accept-encoding: | gzip |
| x-protocol-version: | 1 |

The entitlements protocol response is an HTTP message. In some embodiments, the response message includes the headers shown in Table 2.

TABLE 2

| Header Field | Header Value |
| --- | --- |
| content-type: | application/json |
| content-encoding: | gzip |
| content-length: | <integer> |

In some embodiments, both the request and response message bodies are compressed using gzip. gzip is a file format and software application used for file compression and decompression.

Entitlements Protocol Requests and Responses

Both requests and responses use JSON format, in some embodiments. The top-level JSON element is an array, and the members of this array are objects. Each request to the server can include multiple actions by supplying multiple dictionaries in a request. The server may provide a matching response for each action part of the same request. The type of action is indicated by the action-name field. In a single request, a particular type of action may appear at most once. For instance, if a request contains an action of type getEntitlement, there must not be any other actions of type getEntitlement. Each action request contains a unique request-id, which need be unique only in the scope of the current request. An action response, in some embodiments, contains a response-id which matches the corresponding request-id of the request. The client and server re-use the same TCP connection. During an AKA (Authentication and Key Agreement) session, multiple request/response exchanges or roundtrips will occur over the TCP connection. Once the transaction is completed either with a successful or failed authentication, the server can release the connection.

Figure 5A:
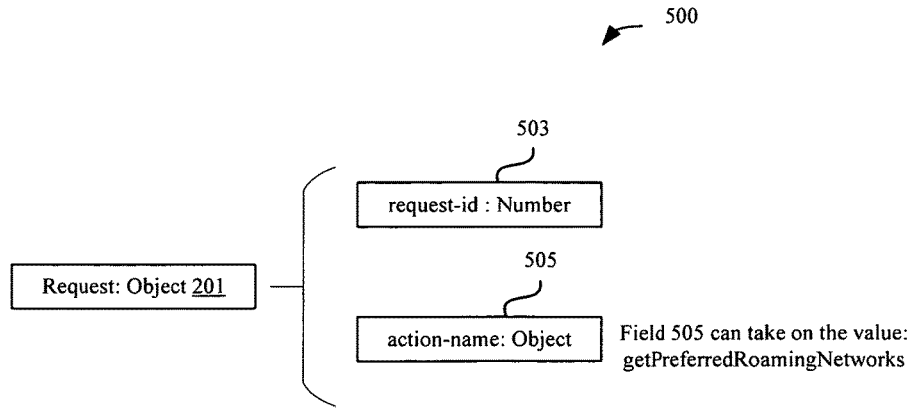
FIGS. 5A-5B illustrate data representations of the request and response, respectively, according to some embodiments.
Figure 5B:
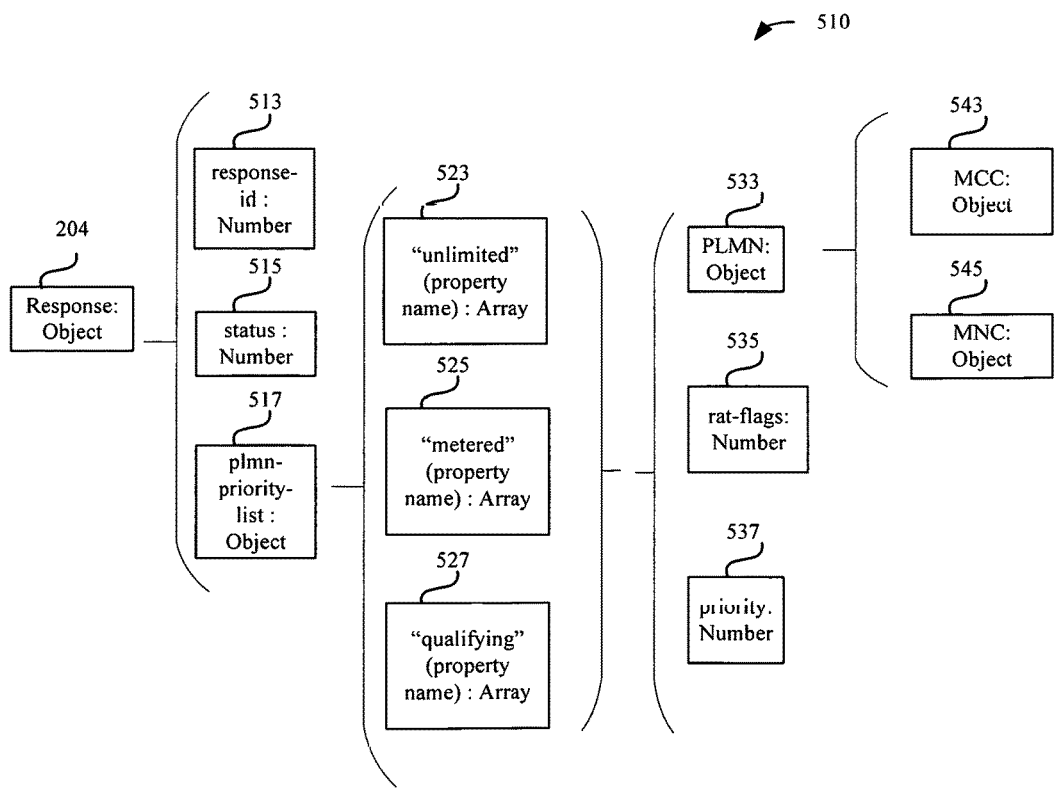

FIGS. 5A and 5B illustrate the JSON data representation used in the request and response messages, respectively. In JSON, an object structure is represented as a pair of curly brackets surrounding zero or more name/value pairs (or members). A name is a string. A single colon comes after each name, separating the name from the value. A single comma separates a value from a following name. Numbers are in base 10 using decimal digits. For more information on JSON see RFC 7159.

In FIG. 5A, 503 and 505 are name value pairs that occur in the request 201. In FIG. 5B, 543 (MCC) and 545 (MNC) are name/value pairs that occur in an array associated with name/value pair 533 (PLMN). Distinct instances of name/value pairs 533 (PLMN), 535 (rat-flags) and 537 (priority) occur within each of the name/value pairs 523, 525, and 527 as indicated by the back-to-back brackets. Name/value pairs 523 (unlimited), 525 (metered), and 527 (qualifying) occur within the name/value pair 517 "plmn-priority-list:Object". The name/value pairs 513, 515, and 517 are in the body of the response message 204. Table 4 provides an example of the PLMN list with names and values populated with actual data. In general, a dictionary or object may be referred to as a Hash, a number may be referred to as an Int, and a property name may be referred to as a Key.

Table 3 provides exemplary values of RAT flags. "0x" indicates hexadecimal notation (i.e., base 16).

TABLE 3

| Radio Access Technology | Bit |
| --- | --- |
| GSM | 0 × 1 |
| CDMA 1x | 0 × 2 |
| WCDMA/UMTS | 0 × 4 |
| TDS-CDMA | 0 × 8 |

TABLE 3-continued

| Radio Access Technology | Bit |
|---|---|
| EVDO | 0 × 10 |
| LTE | 0 × 20 |
| VoLTE | 0 × 40 |
| Wi-Fi Calling | 0 × 80 |

Table 4 provides an example of the response 204 populated with actual data. In Table 4, the qualifying bucket is referred to as others_preferred. Alternative expressions for the qualifying bucket (similarly the qualifying array) are "others bucket," or "others_preferred bucket."

TABLE 4

```
{
"response-id": 1,
"status":6000,
"plmn-priority-list": {
"unlimited":[
{
"plmn":{
"mcc":"310",
"mnc":"ANY"
},
"rat-mask":229,
"priority":1
},
{
"plmn":{
"mcc":"311",
"mnc":"ANY"
},
"rat-mask":229,
"priority":1
}
],
"metered":[
{
"plmn":{
"mcc":"234",
"mnc":"ANY"
},
"rat-mask":229,
"priority":1
},
{
"plmn":{
"mcc":"280",
"mnc":"ANY"
},
"rat-mask":101,
"priority":2
}
],
"others_preferred":[
{
"plmn":{
"mcc":"214",
"mnc":"01"
},
"rat-mask":229,
"priority":1
},
{
"plmn":{
"mcc":"214",
"mnc":"06"
},
"rat-mask":229,
"priority":1
},
{
"plmn":{
"mcc":"214",
"mnc":"09"
},
```

TABLE 4-continued

```
"rat-mask":101,
"priority":1
},
{
"plmn":{
"mcc":"214",
"mnc":"ANY"
},
"rat-mask":101,
"priority":2
}
]
}
}
```

When the wireless device 111 reads the PLMN list, for example, the array called "plmn-priority-list" in Table 4, PLMNs from the unlimited object such as "310ANY" and "311ANY" are preferred over PLMNs in the metered object and PLMNs in the others_preferred object (corresponding to the bucket also referred to as "qualifying" herein). 310 and 311 are MCC values that occur in the United States. The PLMNs 21401, 21406, and 21409 have the same priority (priority 1), same wireless carrier (although not evident from the MNC values 01, 06, and 09) and are preferred over other remaining PLMNs under 214ANY (priority 2). 214 is the MCC value corresponding to Spain. 21401 refers to a mobile network operator with mobile network code (MNC) value of 01 and so 21401 is the PLMN of that mobile network operator in Spain.

A generic push message is provided in Table 5. For example, <action1> will take on the value preferred-networks-updated to trigger a request by the wireless device 111 for an updated PLMN list.

TABLE 5

```
{
"entitlement-update": {
"timestamp": <string: ISO 8601 formatted date>,
"trigger-actions": [<action1>,<action2>,...,<actionN>]
}
}
```

An example request is provided in Table 6. The value associated with the name "request-id" is an integer unique within the request. The value associated with the name "action-name" is a string.

TABLE 6

```
{
"request-id": 1 ,
"action-name": "getPreferredRoamingNetworks"
}
```

The response, in some embodiments, is characterized by properties as shown in Table 7. The qualifying bucket is referred to as "others" in Table 7.

TABLE 7

| Property | JSON Type | Description |
|---|---|---|
| response-id | Integer | Matches the request-id for which this response applies. Unique within the response. |
| status | Integer | Value(s): STATUS_SUCCESS, STATUS_DISALLOWED_ACTION, STATUS_TEMPORARY_FAILURE |
| plmn-priority-list | Object | Value(s): List of preferred Visited PLMNs the wireless device can use during PLMN selection in roaming. Only roaming networks are listed in this object. |
| plmn-prioritylist.unlimited | Array of Objects | Value(s): Unlimited data usage PLMNs based on User's data plan ordered by priority. Definition: Unlimited PLMNs are expected to allow the user's unlimited data usage in roaming with no overage charge. Selection priority: PLMNs listed as unlimited will be preferred over PLMNs listed in "metered" and "others" PLMN categories. |
| plmn-prioritylist.metered | Array of Objects | Value(s): Metered data usage PLMNs based on User's data plan ordered by priority. Definition: PLMNs for which the user has a data usage limited allowance included as part of its data plan. PLMNs in this list are not considered unlimited. Selection priority: PLMNs listed as metered will be preferred over PLMNs present in "others" PLMNs but lower priority than "unlimited." |
| plmn-prioritylist.others | Array of Objects | Value(s): Other PLMNs are PLMNs that are used by baseband to optimize PLMN selection. User may or may not have roaming plan. Selection priority: PLMNs listed as metered will be preferred over PLMNs present in "others" PLMNs but lower priority than "unlimited." In case there are no PLMNs in the others (also referred to as "qualifying") category, the server shall return an empty object for the category. |
| plmn-priority-list.[unlimited\|metered\|others].plmn | Object | Value(s): This object identifies the Roaming PLMNs within each category: 'unlimited', 'metered' or 'others'. It is an object with 2 attributes: 'mcc' and 'mnc'. PLMNs from the same countries must be adjacent to each other in their position in the array. The order in which they appear in the array determine priority. Same country PLMNs with same priority, the priority attribute can be used to specify same level of priority. |
| plmn-priority-list.[unlimited\|metered\|others].plmn.mcc | String | Specifies the Mobile Country Code (MCC) portion of the PLMN identifier. |
| plmn-priority-list.[unlimited\|metered\|others].plmn.mnc | String | Specifies the Mobile Network Code (MNC) portion of the PLMN identifier. If set to the string value "ANY," then it specifies all MNCs under the associated MCC. |
| plmn-priority-list.[unlimited\|metered\|others].rat-mask | Integer | Value(s): Bitmask in decimal notation identifying the RATs supported for this PLMNs<br>  1-GSM<br>  2-CDMA 1×<br>  4-WCDMA/UMTS<br>  8-TDS-CDMA<br>  16-EVDO<br>  32-LTE<br>  64-VoLTE<br>  128-Wi-Fi (i.e. Wi-Fi Calling) |
| plmn-priority-list.[unlimited\|metered\|others].priority | Integer | Value(s): This defines the priority of each MNC compared to its adjacent MNC in the array. |

The wireless device 111 uses the position of each PLMN in the array to determine the preference compared to other PLMNs within the same country. Therefore, a PLMN listed with a priority attribute value or index of 2 will be preferred over a PLMN listed with a priority attribute value or index of 3 or above. The server takes this into consideration when populating each category. In addition, to account for PLMNs that may have a similar priority or preference the server can use the priority property (plmn-priority-list[unlimited|metered|others].priority) to define an equal level of preference for two or more contiguous PLMNs in the array.

Figure 6:
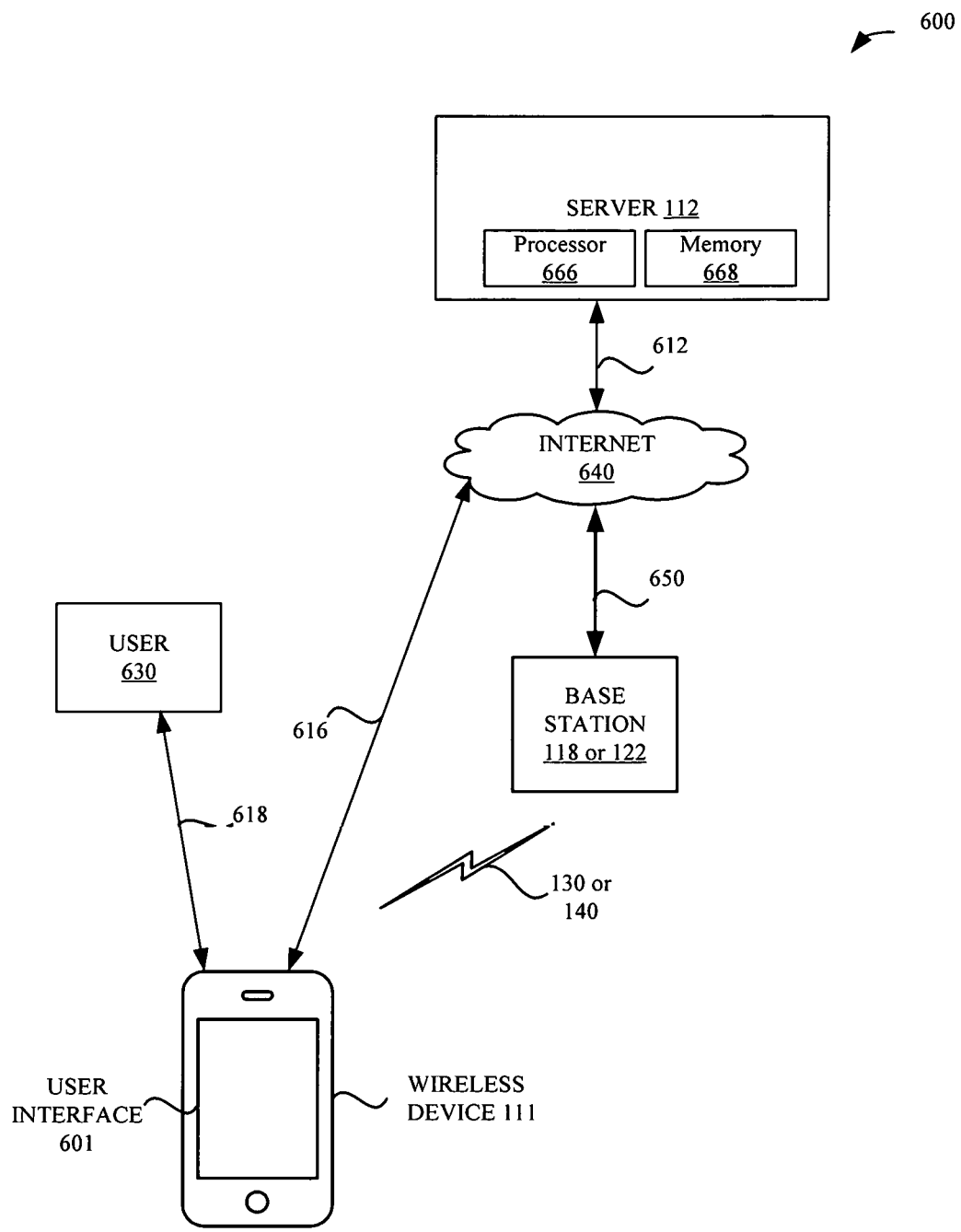
FIG. 6 illustrates an end user being prompted to select a roaming plan, according to some embodiments.

FIG. 6 illustrates a system 600 including the wireless device 111 in use by a user 630 while the server 112 is reachable via the Internet 640 either by a base station, for example base station 118 or 122 or via a wired or Wi-Fi connection 616. The entitlements server 112 or the entitlements client 417 in the wireless device 111 causes a prompt to be sent to the user via user interface 601; the prompt suggests a roaming plan or provides roaming plan options. For example, the entitlements client 417, in some embodiments, provides a primitive over a service access point to the application 419 and the application 419 interacts with the user 630 via the user interface 601. The qualifying (also referred to as "others" or "others_preferred") bucket, in some cases, holds a PLMN identity, for example PLMN W, that the server 112 or the entitlements client 417 determines would be valuable for the user 630 to upgrade to the unlimited bucket or the metered bucket. The prompt, in some embodiments, suggests that the user add PLMN W to user user's roaming plan. If the user agrees, then PLMN W is added to the roaming plan. In some embodiments, agreement by the user causes the client 417 to send a request message to the server 112 and the server 112 updates the user's roaming plan on database 113 accordingly. After an update of the roaming plan, the server 112 creates an updated PLMN list and provides it to the wireless device 111 for storage in non-volatile memory.

The server 112 comprises one or more processors 666 and associated memory 668 for storing instructions. The instructions execute on the one or more processors and perform the functions necessary to receive and send the messages and to create the PLMN list of FIG. 2 and to perform the functions of the various protocol layers shown in FIG. 4 and the logic of FIGS. 3 and 8.

Figure 7:
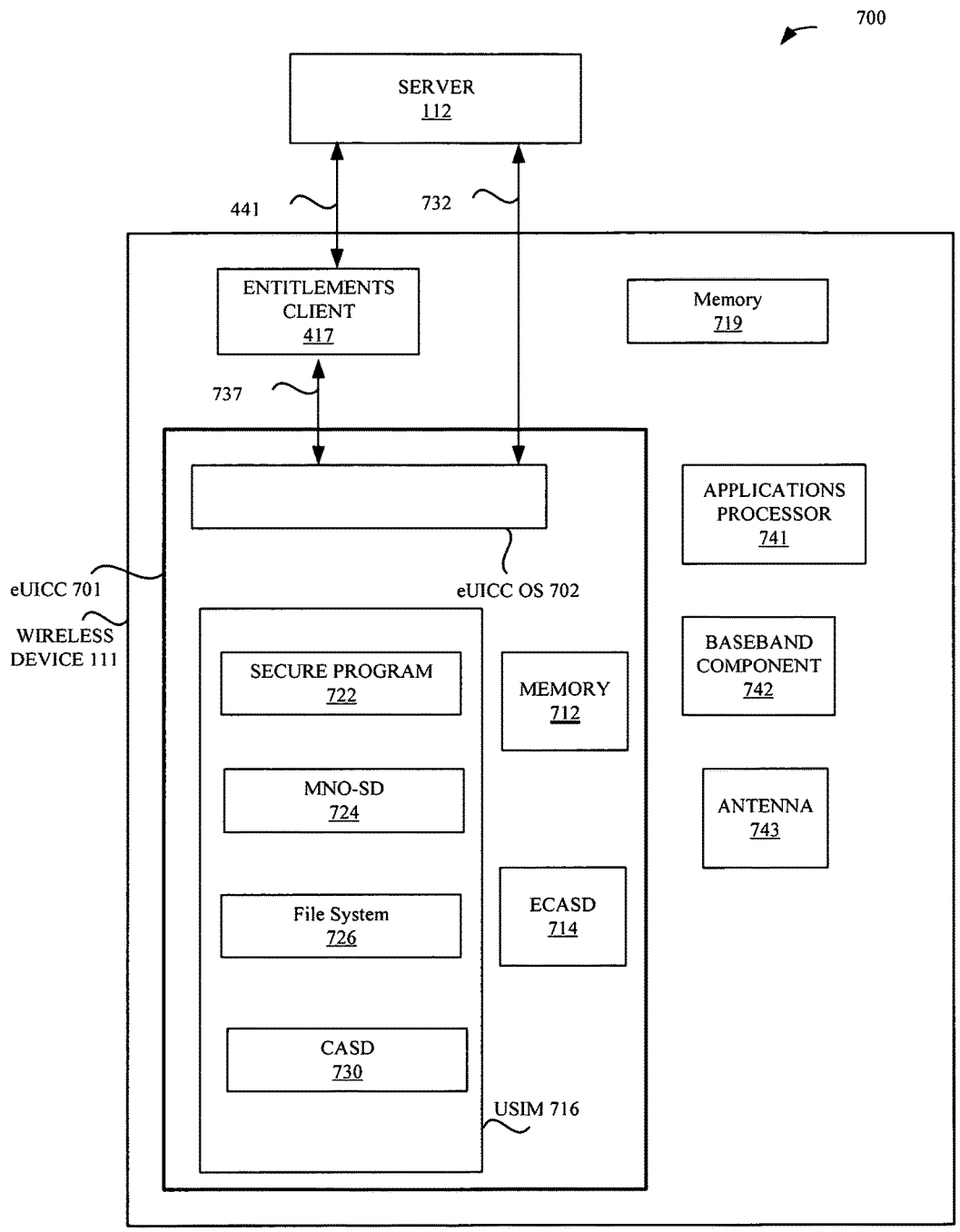
FIG. 7 illustrates an exemplary wireless device with an eUICC and USIM. The PLMN list is stored in one or more available non-volatile memories, according to some embodiments.

FIG. 7 illustrates a system 700 with further description of the wireless device 111 which includes memory 719. The wireless device 111, in some embodiments, includes an eUICC 701 which includes memory 712. The eUICC 701, in some embodiments includes an USIM 716 (or profile or eSIM profile). The USIM 716 includes a secure program 722 comprising instructions for executing authentication and encryption algorithms, security domain MNO-SD 724, a file system 726 and a certificate authority security domain CASD 730. CASD stands for certificate authority security domain. Wireless Carrier A of PLMN1, in some embodiments, controls and updates the USIM 716 via the MNO-SD 714. The CASD 730, in some embodiments, stores keys used in security procedures such as EAP-AKA. The PLMN list, in some embodiments, is stored memory 719, memory 712, and/or as an elementary file (EF) in the file system 726. The server 112 communicates with the entitlements client 417 over the flow 441. The entitlements client 417 communicates with eUICC operating system 702 as shown by the double-headed arrow 737, for example, during an EAP-AKA procedure. The server 112, in some embodiments, also communicates directly with the eUICC OS 702 via a connection 732. Security on the connection 732, in some embodiments, is based on keys from the ECASD 714.

FIG. 7 also illustrates an applications processor 741, a baseband component 742 and an antenna 743. Scanning operations to detect signal such as signals 140 of base station 122 are done, in some embodiments, by the baseband component 742 using the antenna 743. The applications processor 741, in some embodiments, executes instructions from memory 719 or another wireless device memory to perform the functions of the entitlements client 417. In some embodiments, the applications processor carries out the movement of data or signals to implement the signals shown as 441, 732 and 737.

Figure 8:
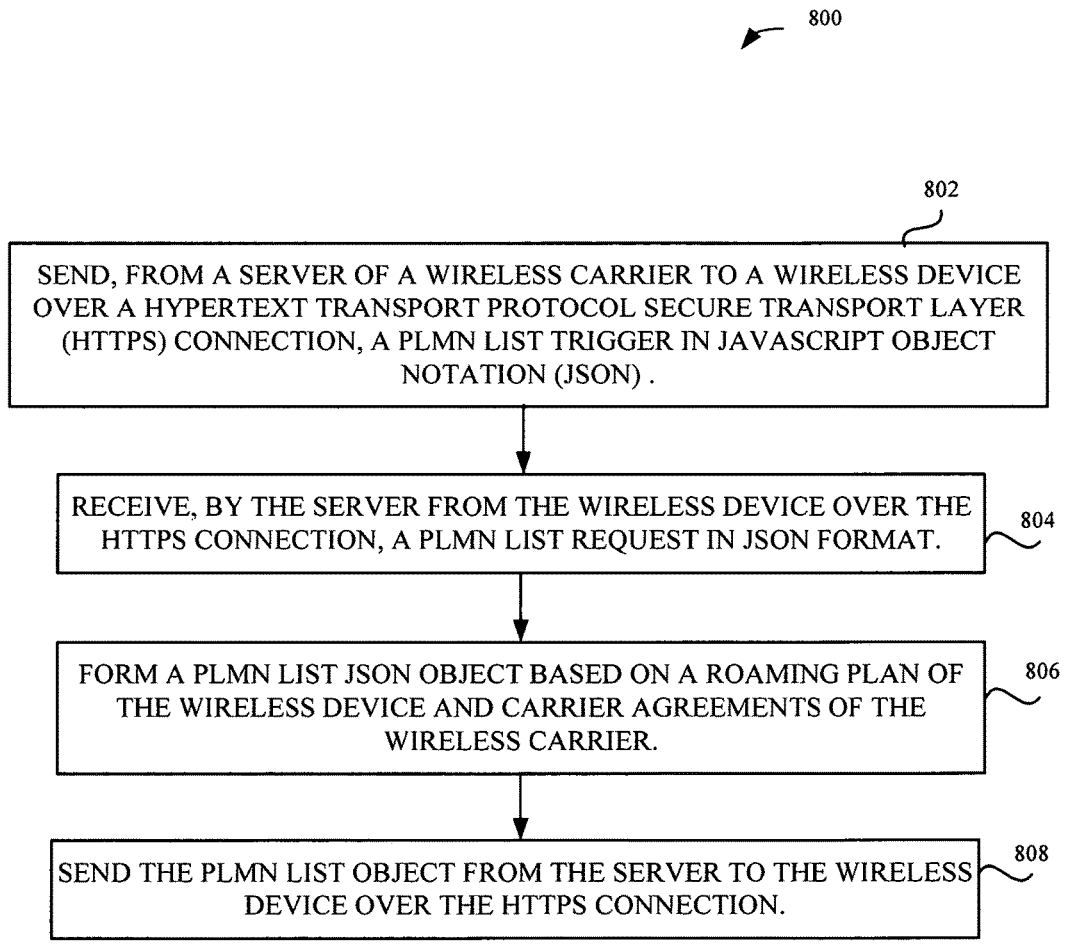
FIG. 8 illustrates exemplary logic for a server and wireless device exchanging trigger, request, and response messages in JSON format over an HTTPS connection to provide a PLMN list to the wireless device, according to some embodiments.

FIG. 8 illustrates logic for a server hosted by a wireless carrier forming a PLMN list using JSON. At 802, the server sends a PLMN list trigger over an HTTPS connection to a wireless device. At 804, the server receives from the wireless device a PLMN list request in JSON. At 806, the server forms the PLMN list JSON object based on a roaming plan of the wireless device and carrier agreements of the wireless carrier. At 808, the server sends the PLMN list object to the wireless device over the HTTPS connection.

Representative Exemplary Apparatus

Figure 9:
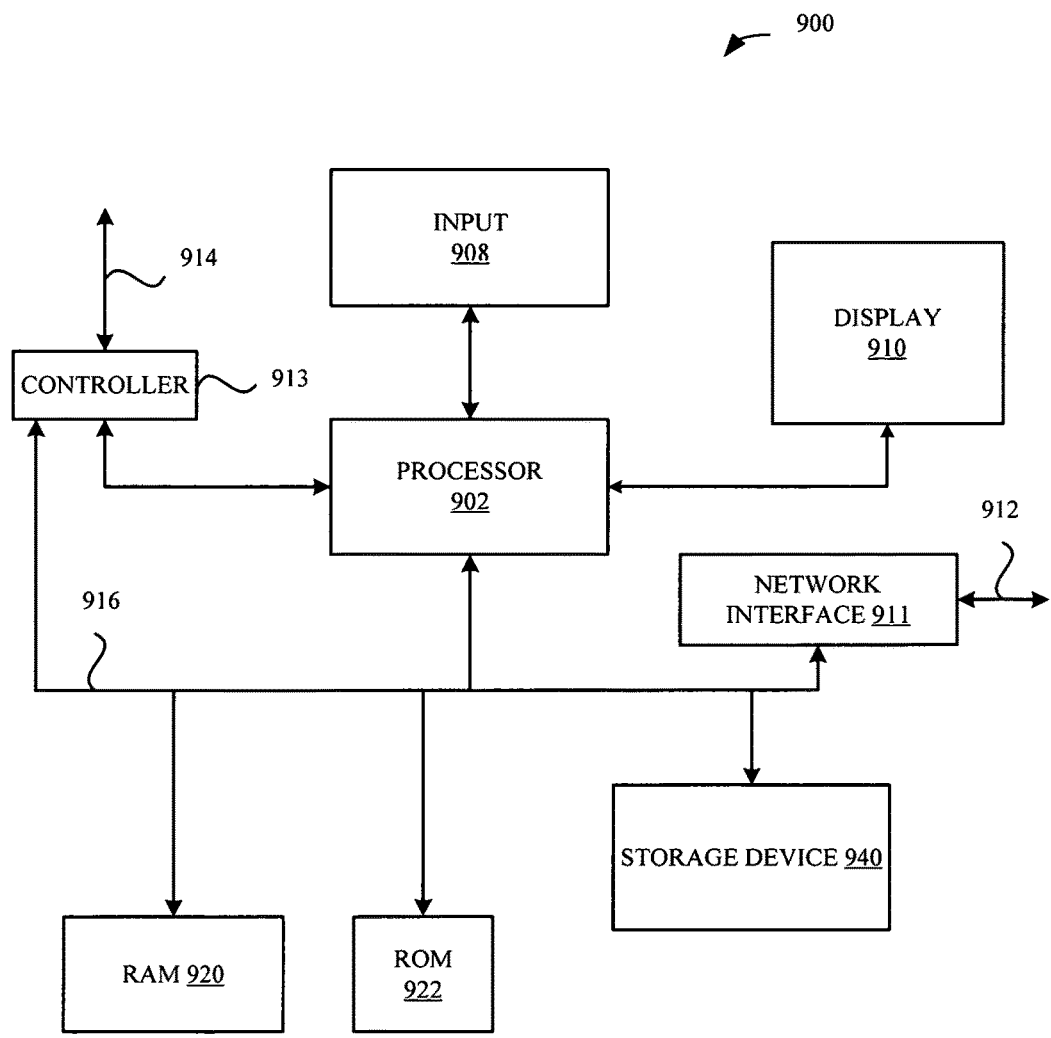
FIG. 9 illustrates an exemplary apparatus for implementation of the embodiments disclosed herein.

FIG. 9 illustrates in block diagram format an exemplary computing device 900 that can be used to implement the various components and techniques described herein, according to some embodiments. In particular, the detailed view of the exemplary computing device 900 illustrates various components that can be included in the wireless device 111 the eUICC 701 and the server 112 illustrated in one or more of FIGS. 1, 4, 6, and 7. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user (for example, information relating to incoming, outgoing, or active communication session). A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband processor.

The computing device 900 also includes a storage device 940, which can comprise a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random Access Memory ("RAM") 920 and a Read-Only Memory ("ROM") 922. The ROM 922 can store programs, utilities or processes to be executed in a non-volatile manner. The RAM 920 can provide volatile data storage, and stores instructions related to the operation of the computing device 900.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wireless device, the wireless device comprising:
a user interface;
a processor;
a memory;
a baseband component;
a universal subscriber identity module (USIM); and
a memory storing instructions that, when executed by the processor, cause the wireless device to:
establish a transport control protocol (TCP) connection to a server, wherein the server is an entitlements server hosted by a wireless carrier,
send a public land mobile network (PLMN) list request comprising a wireless device identifier to the server over the TCP connection,
receive a response comprising a PLMN list from the server over the TCP connection, and
command the baseband component to scan for channels using the PLMN list,
wherein:
the PLMN list is based on a roaming plan associated with the wireless device identifier,
the wireless device identifier is uniquely associated with the wireless device, and
the PLMN list comprises an unlimited array associated with an absence of an overage charge and a metered array associated with a data allowance value.

2. The wireless device of claim 1, wherein execution of the instructions further causes the wireless device to:
format the PLMN list request as part of a hypertext transport protocol transport level (HTTP) protocol flow, wherein the HTTP protocol flow is carried as a protocol layer above the TCP connection.

3. The wireless device of claim 2, wherein execution of the instructions further causes the wireless device to:
secure the HTTP protocol flow to produce an HTTP transport layer security (HTTPS) protocol flow, by requesting the USIM to verify authentication credentials of the server.

4. The wireless device of claim 1, wherein:
the unlimited array comprises a first PLMN identifier corresponding to a first PLMN,
the wireless device can use the first PLMN when roaming without incurring the overage charge, and
execution of the instructions further causes the wireless device to register with the first PLMN regardless of a state of a roaming switch parameter.

5. The wireless device of claim 1, wherein the metered array comprises a PLMN identifier corresponding to a PLMN that the wireless device can use when roaming without incurring the overage charge while a total data usage remains below the data allowance value.

6. The wireless device of claim 1, wherein the PLMN list further comprises a qualified array comprising a candidate PLMN identifier.

7. The wireless device of claim 6, wherein execution of the instructions further causes the wireless device to:
provide a prompt, via the user interface, the prompt allowing selection of the candidate PLMN identifier from the qualified array,
receive a user response, via the user interface, comprising a PLMN selection,
send to the server the PLMN selection,
request an updated PLMN list,
receive the updated PLMN list, and
forward the updated PLMN list to the USIM for storage in a file system.

8. A method for a wireless device to obtain a public land mobile network (PLMN) list from a server, the method comprising:
by the wireless device:
establishing a transport control protocol (TCP) connection to the server, wherein the server is an entitlements server hosted by a wireless carrier,
sending a PLMN list request comprising a wireless device identifier to the server over the TCP connection,
receiving a response comprising a PLMN list from the server over the TCP connection, and
commanding a baseband component of the wireless device to scan for channels using the PLMN list,
wherein:
the PLMN list is based on a roaming plan associated with the wireless device identifier,
the wireless device identifier is uniquely associated with the wireless device, and
the PLMN list comprises an unlimited array associated with an absence of an overage charge and a metered array associated with a data allowance value.

9. The method of claim 8, further comprising:
by the wireless device:
formatting the PLMN list request as part of a hypertext transport protocol transport level (HTTP) protocol flow, wherein the HTTP protocol flow is carried as a protocol layer above the TCP connection.

10. The method of claim 9, further comprising:
by the wireless device:
securing the HTTP protocol flow to produce an HTTP transport layer security (HTTPS) protocol flow, by requesting a universal subscriber identity module (USIM) of the wireless device to verify authentication credentials of the server.

11. The method of claim 8, wherein:
the unlimited array comprises a first PLMN identifier corresponding to a first PLMN,
the wireless device can use the first PLMN when roaming without incurring the overage charge, and
the method further comprises the wireless device registering with the first PLMN regardless of a state of a roaming switch parameter.

12. The method of claim 8, wherein the metered array comprises a PLMN identifier corresponding to a PLMN that the wireless device can use when roaming without incurring the overage charge while a total data usage remains below the data allowance value.

13. The method of claim 8, wherein the PLMN list further comprises a qualified array comprising a candidate PLMN identifier.

14. The method of claim 13, further comprising:
by the wireless device:
providing a prompt, via a user interface of the wireless device, the prompt allowing selection of the candidate PLMN identifier from the qualified array,
receiving a user response, via the user interface, comprising a PLMN selection,
sending to the server the PLMN selection,
requesting an updated PLMN list,
receiving the updated PLMN list, and
forwarding the updated PLMN list to the USIM for storage in a file system.

15. An apparatus configurable for operation in a wireless device, the apparatus comprising:
a processor; and
a memory communicatively coupled to the processor and storing instructions that, when executed by the processor, cause the wireless device to:
establish a transport control protocol (TCP) connection to a server, wherein the server is an entitlements server hosted by a wireless carrier,
send a public land mobile network (PLMN) list request comprising a wireless device identifier to the server over the TCP connection,
receive a response comprising a PLMN list from the server over the TCP connection, and
command the baseband component to scan for channels using the PLMN list,
wherein:
the PLMN list is based on a roaming plan associated with the wireless device identifier,
the wireless device identifier is uniquely associated with the wireless device, and
the PLMN list comprises an unlimited array associated with an absence of an overage charge and a metered array associated with a data allowance value.

16. The apparatus of claim 15, wherein:
the unlimited array comprises a first PLMN identifier corresponding to a first PLMN,
the wireless device can use the first PLMN when roaming without incurring the overage charge, and
execution of the instructions further causes the wireless device to register with the first PLMN regardless of a state of a roaming switch parameter.

17. The apparatus of claim 15, wherein:
the PLMN list comprises a qualified array comprising a candidate PLMN identifier, and execution of the instructions further causes the wireless device to:
provide a prompt, via a user interface of the wireless device, the prompt allowing selection of the candidate PLMN identifier from the qualified array,
receive a user response, via the user interface, comprising a PLMN selection,
send to the server the PLMN selection,
request an updated PLMN list,
receive the updated PLMN list, and
forward the updated PLMN list to the USIM for storage in a file system.

18. The apparatus of claim 15, wherein the metered array comprises a PLMN identifier corresponding to a PLMN that the wireless device can use when roaming without incurring the overage charge while a total data usage remains below the data allowance value.

19. The apparatus of claim 15, wherein the PLMN list further comprises a qualified array comprising a candidate PLMN identifier.

20. The apparatus of claim 15, wherein the PLMN list request is formatted as part of a hypertext transport protocol transport level (HTTP) protocol flow carried as a protocol layer above the TCP connection.

* * * * *